United States Patent [19]

Purdie

[11] 4,324,475
[45] Apr. 13, 1982

[54] LASER COMPONENT

[75] Inventor: Anthony F. Purdie, Glasgow, Scotland

[73] Assignee: Barr & Stroud Limited, Glasgow, Scotland

[21] Appl. No.: 145,496

[22] Filed: Apr. 29, 1980

[30] Foreign Application Priority Data

Jun. 26, 1979 [GB] United Kingdom ............... 22261/79

[51] Int. Cl.³ .................................................. G01B 9/02
[52] U.S. Cl. ........................................ 356/352; 372/98
[58] Field of Search ................... 356/352; 331/94.5 S, 331/94.5 L, 94.5 ML

[56] References Cited

U.S. PATENT DOCUMENTS

| 3,725,814 | 4/1973 | Schlossberg | 331/94.5 S |
| 4,081,760 | 3/1978 | Berg | 356/352 X |
| 4,081,765 | 3/1978 | Berg et al. | 331/94.5 L X |
| 4,152,674 | 5/1979 | Taguchi | 356/352 X |

Primary Examiner—John K. Corbin
Assistant Examiner—Matthew W. Koren
Attorney, Agent, or Firm—Mason, Fenwick & Lawrence

[57] ABSTRACT

An etalon for use in lasers, particularly CW dye lasers, comprises a pair of plates, 10,11 respectively mounted at the ends of a tube 12 with the distal faces 10a, 11a of the plates parallel and the chamber 13 formed within the tube 12 between plates 10,11 is substantially completely filled with a fluid 20 whose refractive index matches that of the plates 10,11 and means 25 are provided for causing extension and contraction of the axial spacing of the plates 10,11. In one embodiment the tube 12 is made of piezoelectric material and the means 25 provides an electrical drive signal to the piezoelectric material. In another embodiment the tube 12 has piezoelectric portions and other portions made of a rigid material. In a further embodiment the tube has portions made of a rigid material which are separated by an elastomer 39 and the means 25 includes a pump 26 which is in fluid communication with the chamber 13. The plates 10 and 11 may be mounted directly on the ends of the tube 12 but more conveniently are mounted on adjustable holders 16, 16a, 17 and 17a.

9 Claims, 6 Drawing Figures

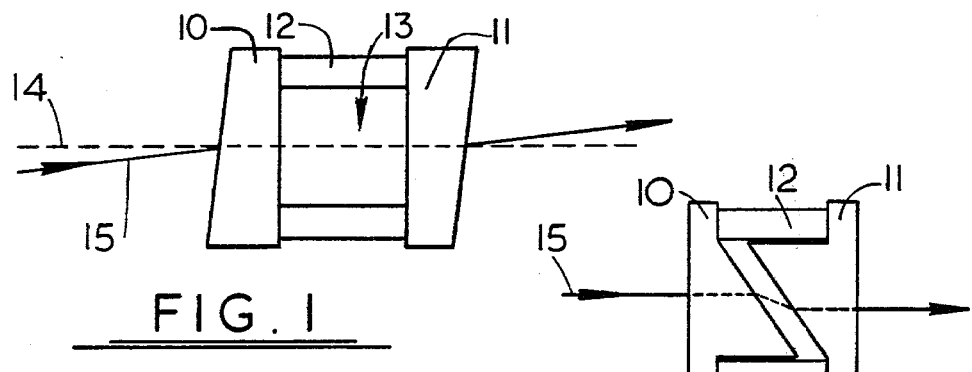
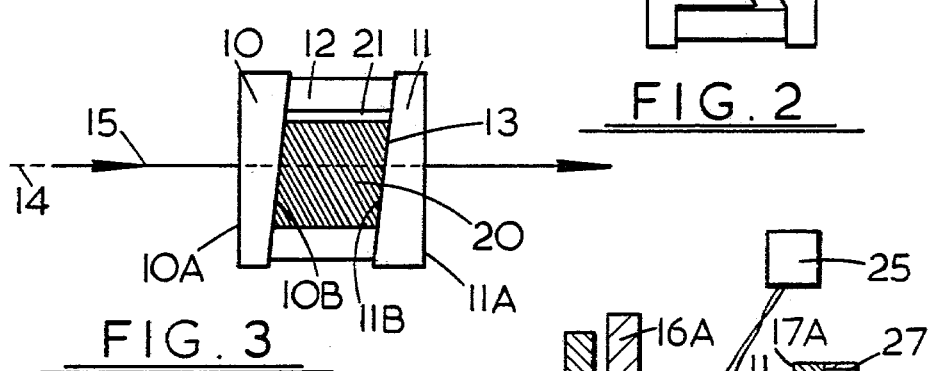
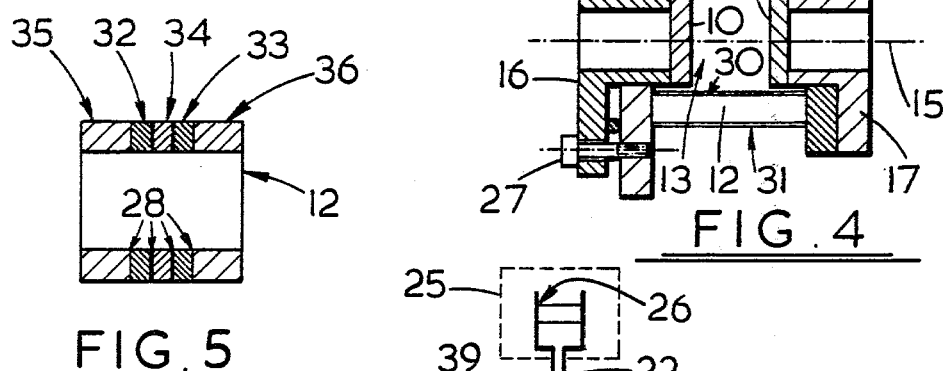

LASER COMPONENT

This invention relates to etalons for use in lasers.

Lasers using conventional reflecting optics for their cavities usually emit a certain number of axial (i.e. longitudinal) "modes". The number and frequency spacing of these modes is determined by the gain bandwidth of the lasing medium and the overall cavity length, as is well known to those skilled in the art.

Thus, a low power Helium-Neon laser has only two or three modes; a high power ion laser (e.g. Argon) has 10-15 modes; while a dye laser may have over 1000 modes.

It is often necessary to select out one of the modes in a laser to provide a single mode laser output. This is done by inserting frequency selective devices into the laser cavity. These devices are designed to have a minimum loss at the required wavelength but introduce losses at other wavelengths sufficient to prevent lasing of modes other than that required. In a C.W. dye laser because so many modes are present several frequency selective devices may be required; for example, a low dispersion device such as a prism or Lyot filter which reduces the output to about 80 modes (which is a frequency range of about 40 GHz) and one or more higher dispersion optics such as Fabry-Perot etalons which have characteristics successively reducing the number of modes at which lasing can be sustained in the laser cavity.

Fabry-Perot etalons are well known in laser technology. In its simplest form the etalon consists of a solid piece of glass or silica at least 0.1 mm thick whose working faces are polished extremely flat and parallel. A dielectric coating may be added to each face to increase the internal reflectivity. A typical C.W. dye laser requires two such etalons for reliable single mode operation and to tune the frequency of the selected laser mode or to select another mode the effect of the etalon must be altered. This is done by either controllably heating or tilting the etalon. The former method is used for systems where fast tuning (or mode changing) is unnecessary but is unsuitable where fast tuning or mode changing is required. Fast tuning is a requirement in electronically-stabilised lasers in order that the bandwidth of the selected output mode may be artificially narrowed. In electronically-stabilised lasers the etalon passband is locked to the laser cavity mode by driving the etalon with an A.C. control signal (known as a 'dither' signal) with a frequency of the order of 1 KHz (which is well known to those skilled in the art). The simple known etalon is controllably tilted for fast tuning since this avoids thermal inertia but if the etalon is greater than about 1 mm thick 'walk off' problems can reduce the laser output power drastically (see e.g. W. R. Leeb, "Losses Introduced by Tilting Intracavity Etalons", Applied Physics, 6, 267-72 (1975)).

In the case of a CW dye laser because adjacent modes are relatively close (in comparison with other forms of laser) adequate selection of an individual mode can only be achieved with a relatively thick etalon, being of the order of 8-10 mm, and consequently walk-off power loss is a major problem.

Two forms of CW dye lasers are at present commercially available in the United Kingdom which are electronically stabilised and in order to avoid the walk-off loss problem of the simple etalon mentioned above the etalons therein used are a composite of three basic components. These etalons are illustrated schematically in FIGS. 1 and 2 respectively.

The etalon shown in FIG. 1 utilises two one-degree wedged plates 10,11 which are mounted at the opposite ends of a piezoelectric tube 12. Electrical signals, such as dither signals may be applied to the piezoelectric tube to cause axial extension and contraction (of the order of 1 micron) thereby enabling the frequency selectiveness of the etalon to be varied. The parallel faces of the plates 10,11 may either be proximal or distal but the plates are separated by an air space 13 and the wedged faces of the plates 10,11 are coated with anti reflection coatings. These coatings are difficult to manufacture reliably. Also, although walk-off power loss is reduced in comparison with a simple etalon of the same thickness controllably tilted, because the etalon is constantly located with its longitudinal axis 14 substantially aligned with the laser optic axis 15 walk-off power loss is still a problem because, inherently, air spaced etalons of this type produce greater losses than an equivalent solid etalon as has been shown by Leeb (see above publication).

The etalon shown in FIG. 2 is a modified version of that shown in FIG. 1 in that the wedge angle is substantial, being sufficient to ensure that the inclined faces, which are proximal, are disposed at Brewster's angle to the laser optic axis 15. The outer faces of the plates 10,11 are parallel. Because the inclined faces of the plates 10,11 are at Brewster's angle they do not require to be anti-reflection coated and since the air space 13 is very small (of the order of 1 mm) the walk-off power loss is within the tolerable limit. However this etalon suffers from the disadvantage that in the air space 13 the optic axis of the laser extends at a substantial angle to the longitudinal axis of the etalon and the length of this part of the optic axis varies according to the separation of the plates 10,11 thereby varying the effective length of the total laser cavity which results in variation in frequency of the individual laser modes. Although this frequency variation is very small in absolute terms it is significant in CW dye laser terms where the frequency separation of adjacent modes is also small with the result that at best there is an undesirable frequency modulation present at the laser output and at worst there is spurious jumping of the output from one mode to another. In a proposal to overcome this problem whilst retaining the advantage of minimal walk-off loss, see French Patent Specification No. 77.16919 published Dec. 30, 1977, the wedged plates are individually mounted on piezoelectric tubes whose remote ends are mounted on fixed supports, the tubes being inclined at such angles to the optic axis of the laser that the extension and contraction thereof whilst varying the effectiveness of the composite etalon does not alter the length of the optic axis in the air space between the Brewster angle faces of the plates. This proposal suffers from the disadvantage that the composite etalon is very complicated in construction.

The present invention is concerned with the provision of a thick etalon for use in a laser which, in operation, produces minimal walk-off loss, minimum variation in effective laser cavity length and yet is simple to construct.

According to the present invention there is provided an etalon for use in a laser comprising a pair of plates respectively mounted at the ends of a tube with the distal faces of the plates parallel, the chamber formed within the tube between the plates being substantially completely filled with a fluid whose refractive index matches that of the plates, and means for causing extension and contraction of the axial spacing of the plates.

Preferably the plates are slightly wedged, the wedged faces being proximal and having a wedge angle which is less than 5 degrees. The distal faces of the etalon plates are optically polished and may or may not have reflection coatings applied and the proximal faces need not be polished to the same degree as the distal faces and are free from anti-reflective coatings. The tube may be made of piezoelectric material in which case the matching fluid is a liquid which is non-compressible, the chamber being sealed and containing the liquid and a very small air space to permit extension and contraction of the etalon to occur whilst retaining the index matching effect of the liquid. In this case the means for causing extension and contraction of the axial spacing of the plates is an electrical dither signal applied to the piezo-electric tube. In the case where such liquid is compressable the chamber need not have any air space. Alternatively, the tube may be made of an inelastic material (such as steel or aluminium) and the plates may be mounted by means of an elastomeric material at the ends of the tube, the means for causing extension and contraction of the axial spacing of the plates being a pump in liquid-tight communication with the chamber to which the dither signal may be applied.

It will be appreciated that the extent of axial extension and contraction required of the etalon is of the order of one micron.

An embodiment of the present invention will now be described by way of example with reference to the accompanying drawings in which FIGS. 1 and 2 illustrate the previously described known etalons;

FIG. 3 illustrates an etalon according to the present invention.

FIG. 4 shows a practical form of the etalon of FIG. 3; and

FIGS. 5 and 6 illustrate modification of details to the FIG. 3 etalon.

In FIG. 3 of the drawing the etalon comprises slightly wedged plates 10,11 arranged with their parallel faces 10A,11A distal, the wedge faces 10B,11B being proximal and secured at respective ends of a piezoelectric tube 12. The chamber which is formed within the tube 12 between the plates 10,11 is substantially completely filled with an index matching liquid 20 there being only a very small air space 21 for the purpose of accommodating the volume of liquid 20 when the tube 12 is in its contracted condition. The wedge angle of the plates 10, 11 is about 1 degree, the plates 10,11 are made of fused silica with refractive index 1.46 and the liquid 20 is liquid paraffin with refractive index 1.45. The parallel faces 10A,11A of the plates 10,11 are optically polished but the wedged faces 10B,11B are not and the plates 10,11 are free from anti-reflection coatings.

The Fresnel reflective loss coefficient R at each interface between the liquid 20 and the plates 10,11 is given by the formula $$R = \left(\frac{n_1 - n_2}{n_1 + n_2}\right)^2$$

where $n_1$ is the refractive index of the plate and $n_2$ is the refractive index of the liquid.

It therefore follows that with the materials of the example quoted $$R = \left(\frac{0.01}{2.91}\right)^2 = 1.2 \times 10^{-5}$$

and consequently the similarity of the indices $n_1$, $n_2$ need not be very exact to obtain matching, a limiting value of $n_1 - n_2$ being of the order of 0.3.

The values of $n_1$ and $n_2$ depend to a large extent on the manufacturing source and the values given above are by way of example only. Published tables indicated a range of $n_1$ between 1.469 and 1.456 depending upon wavelength and a value of $n_2$ of 1.465 at an intermediate wavelength.

The etalon of FIG. 3 is used in the same orientation as that of FIG. 1 but because it is optically equivalent to a solid etalon walk-off power loss is very small and because the laser beam in the liquid 20 has an axial path (or very close thereto) there is no spurious frequency modulation in the laser output nor is there any spurious jumping of the laser output from one mode to another. The etalon is easy to manufacture because there are no anti-reflective coatings on the plates 10,11, only the outer faces 10A,11A of the plates 10,11 need be optically polished to a high figure of merit, and the wedge angle is not critical and need not even be the same for both plates 10,11. Furthermore, only the distal faces 10A,11A of the etalon need be parallel and there is no requirement for angular orientation of the complete etalon in the laser cavity unlike the FIG. 2 arrangement where the Brewster's angle is only effective for a particular angular orientation of the etalon depending upon the direction in which the laser light is polarised. Also, in the FIG. 1 and FIG. 2 arrangements the distal faces and the proximal faces of the plates require to be exactly parallel which means that in addition to accurate manufacture of the plates there must be accurate manufacture of the tube and accurate mounting of the plates at the ends of the tube. The majority of these difficulties are avoided with the FIG. 3 arrangement. Additionally, whilst retaining the same overall thickness the size of the etalon may be altered to any desired extent in order to accommodate large aperture laser beams, this latter advantage being unobtainable with the etalon of FIG. 2 where the etalon thickness and the Brewster angle of the proximal plate faces together impose a limit on the aperture. Also, in comparison with the FIG. 2 etalon the plates 10,11 are very easy to maufacture because in the FIG. 2 arrangement the Brewster angle causes the plates to become prism-like with solid apices which require optical working.

Although the etalon of FIG. 3 is intended for use in CW dye lasers where its properties are most useful it is usable in other forms of laser for similar purposes.

As is shown in FIG. 4 the plates 10,11 need not be directly mounted on the ends of the tube 12 but rather may be mounted (with a bonding agent) on plate holders 16,17 which in turn are mounted on tube holders 16A,17A themselves being bonded to the ends of the tube 12. Between holders 16 and 16A and between holders 17 and 17A there are elastomeric o-ring seals and each plate holder is mounted on its pertaining tube holder by means of three equiangularly spaced bolts 27. Conveniently plate holder 17 is tightly clamped against tube holder 17A by the pertaining bolts 27 and precise optical alignment of plate 10 is achieved by selective positioning of plate holder 16 with respect to tube holder 16A by the pertaining bolts 27. The elastomeric o-rings then prevent escape of the index matching fluid from chamber 13.

FIG. 4 also depicts the electrical connection to the piezoelectric tube 12, the electrodes being in the form of inner and outer coatings 30,31 on the tube wall and connected to a control means 25, in this instance electrical.

FIG. 5 illustrates an alternative electrode form for the tube 12 which in this instance is in the form of two piezoelectric rings 32,33 separated by a copper ring 34 and housed between two aluminium rings 35,36. The electrodes are coatings 28 on the end faces of the rings 32,33. This arrangement has the advantage of shortening the axial length of the piezoelectric content of the tube 12.

FIG. 6 shows the tube 12 formed in three parts of which the outer two parts 37,38 are made of metal and are inelastic whereas the central part 39 is made of elastomeric material. Chamber 13 is in fluid communication via pipe 22 with the control means 25 which in this instance includes a pump 26.

What is claimed is:

1. An etalon for use in a laser comprising a pair of plates respectively mounted at the ends of a tube with the distal faces of the plates parallel, the chamber formed within the tube between the plates being substantially completely filled with a fluid whose refractive index matches that of the plates, and means for causing extension and contraction of the axial spacing of the plates.

2. An etalon as claimed in claim 1, wherein the plates are slightly wedged, the wedged faces being proximal and having a wedge angle which is less than 5 degrees.

3. An etalon as claimed in claim 1, wherein the distal faces of the etalon plates are optically polished and the proximal faces are free from anti-reflective coatings.

4. An etalon as claimed in claim 1, wherein the tube is made of piezoelectric material and the chamber is sealed, and the means for causing extension and contraction of the axial spacing of the plates provides an electrical dither signal which is applied to the piezoelectric tube.

5. An etalon as claimed in claim 4, wherein the liquid is noncompressible and the chamber contains the liquid and a very small air space to permit extension and contraction of the etalon to occur whilst retaining the index-matching effect of the liquid.

6. An etalon as claimed in claim 4, wherein the liquid is compressible and the chamber is free of air.

7. An etalon as claimed in claim 1, wherein the tube is made partly of an inelastic material and partly of an elastomeric material, the means for causing extension and contraction of the axial spacing of the plates being a pump in liquid-tight communication with the chamber and to which a dither signal may be applied.

8. An etalon as claimed in claim 1, wherein the plates are indirectly mounted at the end of the tube by means of adjustable holders whereby precise optical alignment of the distal faces of the plates can be effected.

9. A CW dye laser incorporating an etalon as claimed in claim 1 aligned with the optical axis of the laser.

* * * * *